UNITED STATES PATENT OFFICE.

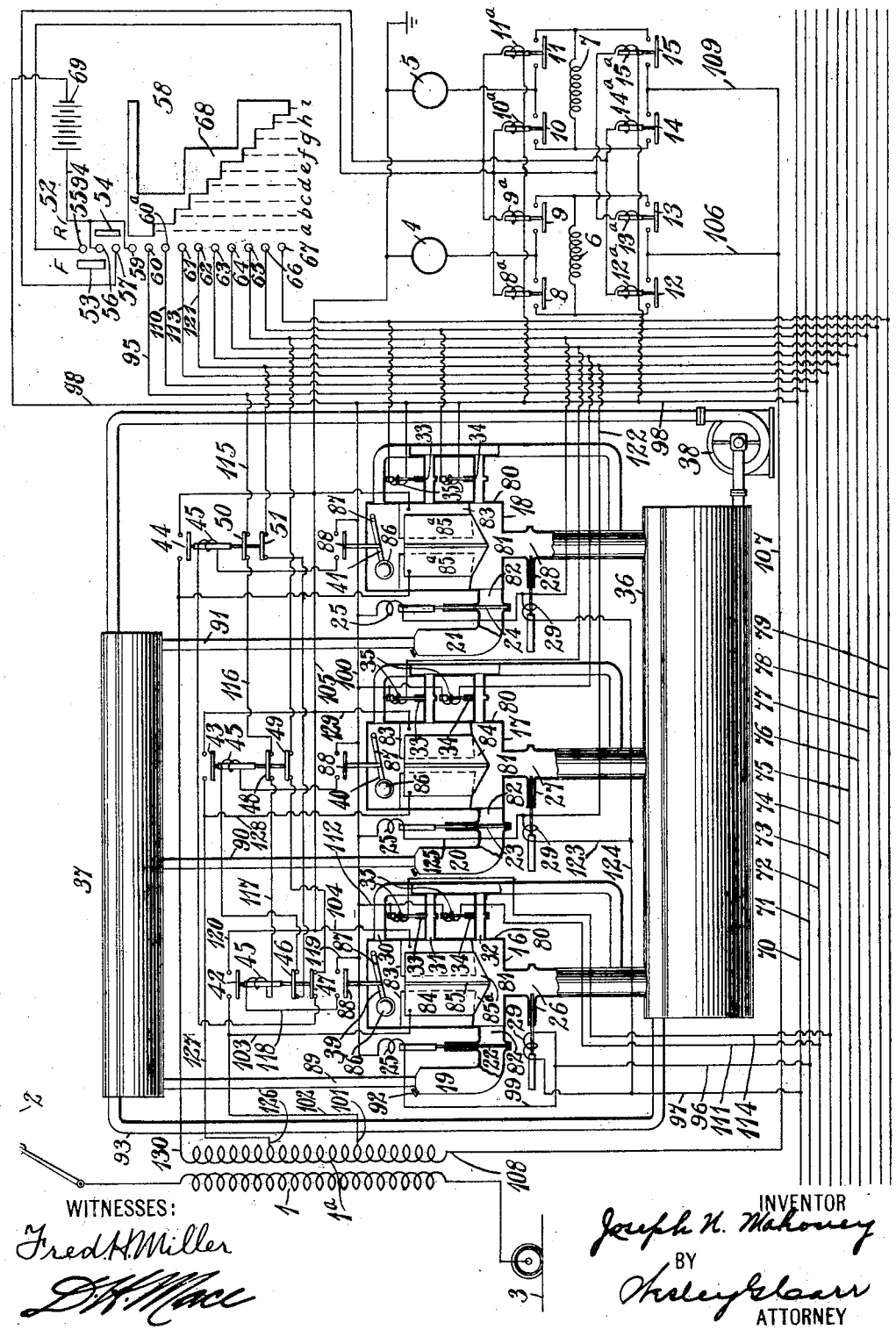

JOSEPH N. MAHONEY, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL FOR DYNAMO-ELECTRIC MACHINES.

1,056,921.  Specification of Letters Patent.  Patented Mar. 25, 1913.

Application filed May 22, 1911. Serial No. 628,739. REISSUED

*To all whom it may concern:*

Be it known that I, JOSEPH N. MAHONEY, a citizen of the United States, and a resident of Wilkinsburg, in the county of Allegheny and State of Pennsylvania, have invented a new and useful Improvement in Systems of Control for Dynamo-Electric Machines, of which the following is a specification.

My invention relates to systems of control for electric motors, and it has special reference to such systems as are adapted to control the operation of single-phase driving motors for electric locomotives and embody so-called "liquid rheostats".

One object of my invention is to provide a system of the above-indicated character which shall be simple in arrangement, inexpensive in construction, reliable and effective in operation and particularly adapted for multiple operation, whereby a plurality of electric locomotives may be controlled by single master controller for operation in multiple.

Another object of my invention is to provide a system of liquid rheostats having a continuous circulation of an electrolyte therethrough and embodying means for causing the initial rush of electrolyte into the electrode tanks to quickly complete the motor circuits without any undue delay or lag after the operation of the master controller. Thus, the motors are adapted to respond immediately to the controller, which is an essential feature in a control system of this type.

Another object of my invention is to provide adequate means for storing a suitable quantity of the electrolyte above the level of the several rheostats whereby a definite and a sufficient head is maintained thereon to insure reliability and uniformity of operation. and to maintain a predetermined normal rate of circulation subsequent to the initial filling of the rheostat tanks. Additional means are also provided for definitely fixing the levels of the electrolyte within the rheostats at several intermediate points, so that the driving motors may be operated in a plurality of running positions and so that successful multiple operation of a plurality of electric locomotives may be accomplished. I secure this result by providing a plurality of overflow ports which are arranged vertically, one above another, in the sides of the rheostat tanks, so that it is possible to definitely control the intermediate levels of the electrolyte within the tanks and at the same time to permit of full normal circulation thereof.

In case of multiple operation, it is evident that a plurality of electric locomotives may be caused to divide the load in the proper proportions by concurrently and definitely fixing the intermediate levels of the electrolytes in the liquid rheostats. In order to secure an exact division of the load among several locomotives, it would, of course, be necessary that the density of the electrolytes in the rheostats of each locomotive should be identical and that the rates of circulation thereof should be substantially the same. However, successful operation may be secured with deviations in the densities of the electrolytes and in the rates of flow, inasmuch as the multiple controlled overflow outlets may be employed to allow the several locomotives to temporarily adjust the load in suitable proportions, as the potential supplied to the driving motors is gradually increased.

The particular advantages of a continuous circulation of the electrolyte reside in a better heat distribution and a smoother and more uniform operation, as well as in material reductions in the sizes and weights of parts.

Although I have illustrated my invention as embodying driving motors of the single-phase type, it will, of course, be understood that I do not confine myself in this respect, as my invention may be applicable to various other types of motors by such slight modifications in the arrangement of circuits and the structural details of the switching apparatus as may be readily made by those skilled in the art.

The single figure of the accompanying drawing is a diagrammatic view of a system of control which embodies my invention.

Referring to the drawing in detail, the system shown comprises a transformer winding 1 which is adapted to receive energy from a suitable supply circuit, such as a trolley conductor 2 and a track 3; a plurality of driving motors of the commutator type having armatures 4 and 5 and field magnet windings 6 and 7, respectively; a plurality of switches 8 to 15, inclusive, for adjusting the connections of said field magnet windings 6 and 7; a plurality of operating magnet windings $8^a$ to $15^a$, inclusive, for actuating the switches 8 to 15, inclusive; a plurality of liquid rheostats 16, 17, and 18 for adjusting the motor connections with the subdivided secondary winding $1^a$ of a transformer 1; a plurality of storage chambers 19, 20 and 21 for containing bodies of electrolyte which are initially admitted into said rheostats; valves 22, 23 and 24 for controlling the admission of said electrolyte; magnet windings 25 for operating said admission valves; valves 26, 27 and 28 for controlling the discharge of said electrolyte from the several rheostats; magnet windings 29 for actuating said discharge valves; overflow ports 30, 31 and 32 provided in each of the rheostats 16, 17 and 18 for fixing the heights of the electrolyte within said rheostats; valves 33 and 34 in said overflow ports 31 and 32 of each rheostat; magnet windings 35 for controlling the operation of said overflow valves; a main reservoir 36 for containing the body of electrolyte; an auxiliary reservoir 37 of smaller capacity and located above the rheostats 16, 17 and 18 for maintaining a constant head thereupon; a pump 38, or other suitable means, for raising the electrolyte into said auxiliary reservoir and for establishing a continuous circulation thereof through said reservoir, rheostats, and the necessary piping; a plurality of float valve switching devices 39, 40 and 41 associated, respectively, with the liquid rheostats 16, 17 and 18 and adapted to be actuated when said rheostats are filled with electrolyte; a plurality of switches 42, 43 and 44 for respectively short circuiting the rheostats 16, 17 and 18 when filled; a plurality of magnet windings 45 for operating said switching devices 42, 43 and 44 subsequent to the action of float valve switching devices 39, 40 and 41; a plurality of auxiliary switches 46 and 47, 48 and 49, and 50 and 51 associated in pairs with the short circuiting switches 42, 43 and 44, respectively, for preventing the closure of more than one short circuiting switch at a time; a reversing switch 52 for controlling the operation of the switches 8 to 15, inclusive, said reversing switch comprising a plurality of movable conducting segments 53 and 54 and coöperating stationary contact terminals 55, 56 and 57, with which they are adapted to make contact; a master controller 58 for controlling the operation of the admission valves 22, 23 and 24, the discharge valves 26, 27 and 28, the overflow valves 33 and 34, and the short circuit switches 42, 43 and 44, said master controller comprising a plurality of stationary contact terminals 59 to 67, inclusive, and a movable conducting segment 68 which is adapted to make engagement therewith along the position-indicating lines $a, b, c, d, e, f, g, h,$ and $i;$ a battery 69, or other suitable source of energy for supplying energy to the magnet windings $8^a$ to $15^a$, 25, 29, 35 and 45; and a plurality of train lines 70 to 79, inclusive, for permitting of multiple operation of several electric locomotives.

The liquid rheostats 16, 17 and 18 are of like construction and each comprises a containing tank 80 having a centrally disposed bottom discharge opening 81, an inlet port 82 located in the lower portion of said tank, and a plurality of overflow ports 30, 31 and 32 vertically disposed in the side thereof. A plurality of vertically disposed plates 83 are suitably secured to opposite sides of the tank 80 and project inwardly toward one another to constitute one of the electrodes of the rheostat. The other electrode 84 is located intermediate the plates 83 of the tank electrode and comprises a supporting member 85 having a plurality of vertically disposed plates $85^a$ projecting outwardly on either side between the several plates 83 of the tank electrode. The electrode 84 is suitably supported and insulated from the tank 80 and the lower edges of its component plates $85^a$ are inclined inwardly and downwardly to form a tapered electrode.

The structural details of the liquid rheostats 16, 17 and 18 form no part of my invention and I do not wish to be restricted in this respect, as various modifications may be effected therein, and any other suitable devices for accomplishing the same purpose may be employed.

The valves 22, 23, 24, 26, 27, 28, 33 and 34 are of an usual gate type, but, of course, any other suitable valves may be employed. The float valve switching devices 39, 40 and 41 are also of like construction, and each comprises a float 86 which is attached to the free end of a lever member 87, the other end of which is pivotally supported, said lever member 87 being provided with a suitable switch member 88. Devices of this type are old and familiar in the art and are only illustrative of suitable devices for accomplishing the desired purpose.

The chambers 19, 20 and 21 are respectively connected to the auxiliary reservoir 37 by means of suitable pipes or headers 89, 90 and 91, and furthermore, each of said chambers is provided with a relief valve 92, which is of well-known construction and is adapted to open inwardly only, in order to admit atmospheric pressure into said chambers when the electrolyte therein is withdrawn.

Assuming the various circuit connections and devices to occupy the positions shown, if the pump 38 is operated, the electrolyte contained within the main reservoir 36 is raised into the auxiliary reservoir 37, from which it fills the chambers 19, 20 and 21, and the headers 89, 90 and 91. The excess electrolyte supplied to the tank 37 is disposed of and returned to the main reservoir 36 through the overflow pipe 93, whereby a continuous circulation is maintained, as will be readily understood. If it is desired to operate the driving motors, the reversing switch 52 is first actuated to cause the one or the other of its movable contact segments 53 and 54 to make engagement with the contact terminals 55 and 56, or 56 and 57, whereby the connections of the field magnet windings 6 and 7 are established for either direction of rotation by means of the switches 8 to 15, inclusive. If the contact segment 53 be caused to engage the contact terminals 55 and 56, the magnet windings $8^a$, $13^a$, $10^a$ and $15^a$ of the switches 8, 13, 10 and 15 are energized and said switches are thereby closed, whereas, if coöperative engagement of the contact segment 54 and the contact terminals 56 and 57 be effected, the magnet windings $9^a$, $12^a$, $11^a$ and $14^a$ of the switches 9, 12, 11 and 14 are energized and said switches are thereby closed. The circuit connections and mode of operation of this portion of the control system are old and familiar to those skilled in the art, and it is not deemed necessary to trace the circuits and to describe the operation, it being believed that no difficulty will be encountered in understadnig the same.

For illustrative purposes, it is to be assumed that the reversing switch 52 is actuated in such direction as to cause the switches 8, 13, 10 and 15 to be closed, whereby the driving motors are arranged for forward rotation. The driving motors may be started by moving the conducting segment 68 of the master controller 58 into contact with the contact terminals 59 and 60 upon the position indicating line $a$, whereby a circuit is established from the positive side of the battery 69, through conductor 94, contact terminal 59, conducting segment 68, contact terminal 60, conductor 95, train line 71 and conductor 96, where the circuit divides, one branch comprising magnet winding 29 of the discharge valve 26, conductor 97, train line 70 and conductor 98 to the negative side of the battery, while the other path comprises conductor 99, magnet winding 25 of the admission valve 22, conductor 100, and conductor 98, to the negative side of the battery. Energy is thereby supplied to the magnet winding 29 of the discharge valve 26 and the magnet winding 25 of the admission valve 22, and the discharge valve 26 is closed while the admission valve 22 is opened. Upon the opening of the admission valve 22, the body of electrolyte contained within the chamber 19 is allowed to suddenly rush into the liquid rheostat 16 and to quickly immerse the lower portions of the coöperating electrodes 83 and 84, thereby completing the motor circuits from a tap 101 in the sub-divided transformer winding $1^a$, through conductor 102, conductor 103, electrode 84, the body of electrolyte within the rheostat 16, electrode 83, conductor 104 and conductor 105, where the circuit divides, one branch including the armature 4, switch 8, field magnet winding 6, switch 13, conductor 106, and conductor 107 to the extremity 108 of the transformer winding $1^a$, while the other branch includes armature 5, switch 10, field magnet winding 7, switch 15, conductor 109 and conductor 107, to the tap 108.

It will be noted that the portion of the circuits which includes the armatures and field magnet windings of the driving motors has not been traced in detail, but it is believed that the circuits are set forth sufficiently clear to enable one skilled in the art to readily understand the same.

Upon the completion of the motor circuits just traced, a low potential is applied to the driving motors, and said motors are caused to rotate in accordance with well-known principles. Care should be exercised in determining the capacities of the storage chambers 19, 20 and 21 and the sizes of the admission valves 22, 23 and 24, in order that the electrolyte contained in said chambers shall be quickly discharged into the liquid rheostats and shall immerse the lower portions of the coöperating electrodes, so that the operation of the motors shall not lag appreciably behind the operation of the master controller. Subsequent to the initial rush of the electrolyte into the liquid rheostat 16, whereby the motor circuits are established, the level thereof is gradually raised by the normal inflow of electrolyte from the auxiliary tank 37 through the header 89. The normal rate of flow, of course, depends upon the diameter of the said header, which should be determined to give rate of circulation desired. It should be further understood that when the electrolyte contained within the chamber 19 is discharged into the rheostat 16, the relief valve 92 opens inwardly and allows the atmosphere to equalize the pressure therein, so that the proper operation of the system is assured.

Inasmuch as the valve 34 in the overflow port 32 is open, the electrolyte cannot rise to a height in excess thereof but is discharged through said overflow port and returned to the main reservoir 36. Thus, it is seen that a continuous circulation of electrolyte is obtained through the rheostat 16, so that the heat developed therein is distributed evenly through the electrolyte and a liberal dissipation thereof is effected.

If it is desired to increase the acceleration of the driving motors, the conducting segment 68 of the master controller 58 is moved into contact with the contact terminal 60ᵃ upon the position-indicating line *b*, whereby a circuit is established from the conducting segment 68, through contact terminal 60ᵃ, conductor 110, train line 72, conductor 111, magnet winding 35 of the overflow valve 34, conductor 112, conductor 100 and conductor 98 to the negative side of the battery. The winding 35 of the overflow valve 34 is energized and the valve 34 is closed, after which the electrolyte gradually rises within the liquid rheostat 16 until the height therein corresponds to that of the overflow port 31. During this gradual rise of electrolyte in contact with the coöperating electrodes 83 and 84, it is evident that resistance is gradually eliminated from the motor circuits and, hence, increase of potential are supplied to the driving motors, causing them to accelerate in the usual manner. When the electrolyte reaches the level of the overflow port 31, a continuous circulation thereof is maintained and the excess electrolyte is returned to the main reservoir 36, as hereinbefore set forth.

Higher speeds of the driving motors may be obtained by moving the conducting segment 68 of the master controller 58 into contact with the contact terminal 61, along the position-indicating line *d*, whereby a circuit is established from the conducting segment 68, through contact terminal 61, conductor 113, train line 73, conductor 114, magnet winding 35 of the overflow valve 33, conductor 112, conductor 100 and conductor 98 to the negative side of the battery. Upon the completion of this circuit, energy is supplied to the magnet winding 35 of the overflow valve 33 and the closure of this valve is accomplished. The level of the electrolyte within the rheostat 16 therefore rises gradually, until the coöperating electrodes 83 and 84 are completely immersed and the excess electrolyte is discharged through the overflow port 30.

As the electrolyte rises into contact with the float 86, the float valve switching device 39 is closed in a well-known manner, thereby establishing a circuit from the conductor 95, through conductor 115, switch 50, conductor 116, switch 48, conductor 117, magnet winding 45 of the short circuit switch 42, conductor 118, switching device 39 and conductor 119, to the negative conductor 100. Upon the completion of this circuit, the magnet winding 45 of the short circuiting switch 42 is energized and the switch 42 is closed, thereby establishing a circuit from the conductor 102, through short circuiting switch 42, conductor 120 to the conductor 105. Thus, the liquid rheostat 16 is short circuited and all of the resistance is eliminated from the motor circuits, so that the driving motors are operated directly from a portion of the transformer winding 1ᵃ.

It will be noted that, as the short circuiting switch 42 is closed, the auxiliary switches 46 and 47 associated therewith are opened, thereby preventing the completion of the control circuits interlocked therewith and preventing the closure of any other short circuiting switch at the same time. The necessity of interlocking each short circuiting switch with each of the other short circuiting switches is evident when it is considered that a closure of any two of these switches would effect a local short circuit on a portion of the transformer winding 1ᵃ which would be injurious to the apparatus and would disturb the operation of the system as a whole.

If a greater acceleration or a higher speed is desired, the conducting segment 68 of the master controller 58 is moved into contact with the stationary contact terminal 62 upon the position-indicating line *d*, whereby a circuit is established from the conducting segment 68, through contact terminal 62, conductor 121, and conductor 122, where the circuit divides, one portion including magnet winding 29 of the discharge valve 27, conductor 123, conductor 124 and conductor 97 to the negative train line 70, while the other branch includes conductor 125, and magnet winding 25 of the admission valve 23 to the negative conductor 100. Energy is thereby supplied to the magnet winding 29 of the discharge valve 27 and the magnet winding 25 of the admission valve 23, the former valve being closed and the latter being opened, whereby the body of electrolyte contained within the chamber 20 is allowed to rush into the liquid rheostat 17 and to partially immerse the coöperating electrodes 83 and 84. Thus, a circuit is completed from tap 126, through conductor 127, conductor 128, electrode 84, body of electrolyte within rheostat 17, electrode 83 and conductor 129, to the conductor 105, from which the circuit through the driving motors is the same as that hereinbefore traced in detail in connection with the operation of the liquid rheostat 16.

It will be understood that, concurrently with the establishment of the circuits just traced, an interruption of the circuits including the magnet windings 45, 29, 25 and 35 of the switch 42 and valves 26, 22, 33 and 34, respectively is effected, thereby causing the short circuiting switch 42 and the valves 29, 33 and 34 to open and valve 22 to close, as will be readily understood. The electrolyte within the liquid rheostat 16 is therefore rapidly discharged, through the discharge opening 81 and the overflow ports 30, 31 and 32, thereby preventing a local short circuit across a section of the transformer winding 1ᵃ and interrupting the motor circuits first completed through the liquid rheostat 16. The acceleration of the driving motors may be further increased by moving the conducting segment 68 of the master controller 58 successively into contact with the contact terminals 63 and 64 upon the position-indicating lines e and f, whereby the overflow valves 34 and 33 are successively closed and the level of the electrolyte within the rheostat 17 is gradually raised. Resistance is therefore eliminated from the motor circuits and increases of potential are supplied to the driving motors. When the liquid rheostat 17 is filled with electrolyte, the switching device 40 is actuated to complete a circuit which includes auxiliary switches 51 and 46, magnet winding 45 of the short circuiting switch 43 and switching device 40. Thus, the short circuiting switch 43 is energized and closed and the rheostat 17 is short circuited, thereby leaving the driving motors connected directly to the transformer winding 1ª with all resistance eliminated from the circuit.

Further increases in the speed of the motors may be effected by moving the conducting segment 68 of the master controller 58 into engagement with the stationary contact terminal 65 upon the position-indicating line g, whereby energy is supplied to the magnet winding 29 of the discharge valve 28 and the magnet winding 25 of the admission valve 24, the valve 24 being opened and valve 28 being closed. The body of electrolyte contained within the chamber 21 is thereby allowed to fill the bottom of the liquid rheostat 18 and to make contact with the coöperating electrodes 83 and 84. A circuit is thus established from the tap 130, through a circuit which includes the coöperating electrodes of the liquid rheostat 18 and the armatures 4 and 5 and field magnet windings 6 and 7 of the driving motors, as will be readily understood in view of similar circuits already traced in detail. In the meantime, the conducting segment 68 of the master controller 58 disengages the contact terminals 62, 63 and 64 and the energizing circuits through the magnet winding 45 of the short circuiting switch 43, magnet winding 29 of the discharge valve 27, magnet winding 25 of the admission valve 23 and magnet winding 35 of the overflow valves 33 and 34 are interrupted. Hence, the short circuiting switch 43, the overflow valves 33 and 34 and the discharge valve 27 are opened, while the admission valve 23 is closed, thus allowing the electrolyte contained within the rheostat 17 to be rapidly discharged into the main reservoir 36. The conducting segment 68 of the master controller 58 may then be moved successively into positions h and i, to effect the energization of the magnet windings 35 of the overflow valves 34 and 33 and to cause the closure thereof. Thus, the electrolyte gradually rises in the liquid rheostat 18 and the resistance in the motor circuits becomes gradually eliminated, so that increases of potential are applied to the driving motors which accelerate in accordance with well known principles.

When the coöperating electrodes within the liquid rheostat 18 have become completely immersed in the electrolyte, the float valve switching device 41 is closed in a manner hereinbefore set forth, whereby energy is supplied to the magnet winding 45 of the short circuiting switch 44. Upon the closure of the switch 44, a circuit is established which bridges the liquid rheostat 18 and therefore leaves the driving motors connected directly to the transformer winding 1ª without any resistance in the motor circuits. Under these conditions, the driving motors are operated at their highest speeds.

While I have shown and described my invention in connection with driving motors of the commutator type which are employed in railway service, I do not wish to limit my invention in this respect, as it may be employed in connection with various types of motors and for various classes of service. Furthermore, although I have set forth an auxiliary reservoir 37, storage chambers 19, 20 and 21, and a plurality of overflow ports 30, 31 and 32, it should be understood that my invention is not limited to the employment of these specific devices, as they are merely illustrative of suitable means for accomplishing the desired results. Obviously, there are various other means by which an initial sudden rush of electrolyte into the rheostats may be effected, after which the normal rate of circulation is maintained, and various other means for definitely locating the heights of the electrolyte within the liquid rheostats, and all such means are intended to be included within the spirit and scope of my invention. Also, I have shown and described my invention as adapted for manual control and as embodying a specific arrangement of circuits, but it will be understood that various changes may be effected therein without materially changing the operation or affecting the result, and such modifications are considered to lie within the province of those skilled in the art. I desire that only such limitations shall be imposed as are indicated in the appended claims.

I claim as my invention:

1. In a control system for dynamo-electric machines, the combination with a derived source of energy, a plurality of liquid rheostats severally connected thereto, and a plurality of dynamo-electric machines adapted to receive energy therefrom, of means for continuously circulating an electrolyte, and means for causing a sudden initial rush of said electrolyte into said rheostats.

2. In a control system for dynamo-electric machines, the combination with a derived source of energy, a plurality of liquid rheostats severally connected thereto, and a plurality of dynamo-electric machines adapted to receive energy therefrom, of means for continuously circulating an electrolyte, means for successively filling said rheostats, and means associated with each rheostat for definitely locating the height of said electrolyte therein.

3. In a system of control for electric motors, the combination with a derived source of energy, a plurality of liquid rheostats severally connected thereto, and a plurality of electric motors associated therewith, of means for continuously circulating an electrolyte, means for directing the flow thereof into any desired rheostat, and means for effecting an increased initial flow thereof into said rheostat.

4. In a system of control for electric motors, the combination with a derived source of energy, a plurality of liquid rheostats severally connected thereto, and a plurality of electric motors associated therewith, of means for continuously circulating an electrolyte for said rheostats, means for initially admitting a relatively large body of said electrolyte into said rheostats, means for maintaining a reduced flow therein, and means for definitely locating the heights of said electrolyte in said rheostats.

5. In a system of control for electric motors, the combination with a derived source of energy, a plurality of liquid rheostats severally connected thereto, and a plurality of electric motors associated therewith, of a main liquid-containing reservoir, an auxiliary reservoir disposed above said main reservoir, means for maintaining a continuous circulation of liquid therethrough, and means for successively filling said rheostats with liquid from said auxiliary reservoir.

6. In a system of control for electric motors, the combination with a derived source of energy, a plurality of liquid rheostats severally connected thereto, and a plurality of electric motors associated therewith, of means for circulating an electrolyte through said rheostats, and means for definitely fixing the level of said electrolyte in said rheostats.

7. In a system of control for electric motors, the combination with a derived source of energy, a plurality of liquid rheostats severally connected thereto, and a plurality of electric motors associated therewith, of means for supplying a continuous circulation of an electrolyte through said rheostats, and a plurality of vertically disposed overflow ports in each rheostat.

8. In a system of control for electric motors, the combination with a derived source of energy, a plurality of liquid rheostats severally connected thereto, and a plurality of electric motors associated therewith, of means for supplying a continuous and uniform flow of an electrolyte through said rheostats, and means for maintaining the level thereof at predetermined heights.

9. In a control system for dynamo-electric machines, the combination with a plurality of liquid rheostats, a liquid-containing reservoir, and means for supplying said liquid to said rheostats, of means for maintaining a substantially constant head upon said rheostats.

10. In a control system for dynamo-electric machines, the combination with a liquid-containing reservoir, a plurality of liquid rheostats, means for circulating said liquid through said rheostats, and means for maintaining a substantially constant head thereon, of means for initially admitting a relatively large amount of liquid into said rheostats.

11. In a control system for dynamo-electric machines, the combination with a main liquid-containing reservoir, a plurality of liquid rheostats, an auxiliary reservoir located above said rheostats and communicating therewith, and means for continuously supplying liquid to said auxiliary reservoir, of means associated with said communicating means between each rheostat and said auxiliary reservoir for causing the liquid initially admitted to said rheostats to effect a quick completion of the electric circuit and subsequently to effect a gradual elimination of resistance therefrom.

12. In a control system for dynamo-electric machines, the combination with a main liquid-containing reservoir, a plurality of liquid rheostats, an auxiliary reservoir located above said rheostats and communicating therewith, and means for continuously supplying liquid to said auxiliary reservoir, of an enlarged chamber in the communicating means between each rheostat and said auxiliary reservoir, whereby a sudden initial rush of liquid into said rheostat is effected.

13. In a control system for electric motors, the combination with a derived source of energy, a plurality of liquid rheostats severally connected thereto, and a plurality of electric motors, of means for continuously circulating an electrolyte, means for successively filling said rheostats with said electrolyte, and means associated with each rheostat for causing the electrolyte initially admitted to quickly establish the electric circuit and subsequently to effect a gradual and uniform elimination of resistance therefrom.

14. In a system of control for dynamo-electric machines, the combination with a main liquid-containing reservoir, a plurality of liquid rheostats, means for circulating said liquid, and means for maintaining a substantially constant head upon said rheostats, of an auxiliary fluid-containing chamber associated with each rheostat and normally closed thereto, and means for opening said chamber to said rheostat.

15. In a control system for dynamo-electric machines, the combination with a liquid-containing reservoir, a plurality of liquid rheostats, means for circulating said liquid, and means for maintaining a constant head upon said rheostats, of a plurality of vertically disposed overflow ports in each rheostat, and means for opening or closing said ports.

16. In a control system for dynamo-electric machines, the combination with a main liquid-containing reservoir, a plurality of liquid rheostats, an auxiliary reservoir located above said rheostats, and means for continuously circulating said liquid through said auxiliary reservoir, of means communicating between each rheostat and said auxiliary reservoir, and means located adjacent to each rheostat for closing said communicating means to said rheostat.

17. In a control system for dynamo-electric machines, the combination with a main liquid-containing reservoir, a plurality of liquid rheostats, and means for raising the liquid above said rheostats, of means associated with each rheostat and adapted to deliver said raised liquid thereto, an enlarged storage chamber adjacent to each rheostat, and means interposed between said chamber and said rheostat for closing said chamber from said rheostat.

18. In a system of control for electric motors, the combination with a derived source of energy, a plurality of liquid rheostats connected thereto, a plurality of electric motors, and means for successively filling said rheostats with a suitable electrolyte, of means for short-circuiting each rheostat when filled with said electrolyte, and means for preventing more than one rheostat being short circuited at the same time.

19. In a control system for dynamo-electric machines, the combination with a plurality of liquid rheostats, a liquid-containing reservoir and means for continuously circulating the liquid in said reservoir, and means for maintaining a substantially constant head upon said rheostats, of electrically controlled means for successively directing the flow of liquid through the several rheostats.

20. In a system of control for electric motors, the combination with a derived source of energy, a plurality of liquid rheostats severally connected thereto, and a plurality of electric motors severally associated therewith, of means for maintaining a substantially constant head upon said rheostats and means for circulating an electrolyte successively through said rheostats.

In testimony whereof, I have hereunto subscribed my name this 4th day of May, 1911.

JOSEPH N. MAHONEY.

Witnesses:
  Frank W. Funk,
  B. B. Hines.

---

Copies of this patent may be obtained for five cents each, by addressing the "Commissioner of Patents, Washington, D. C."